United States Patent
Yoshizaki

(10) Patent No.: US 9,723,285 B2
(45) Date of Patent: Aug. 1, 2017

(54) MULTI-AREA WHITE-BALANCE CONTROL DEVICE, MULTI-AREA WHITE-BALANCE CONTROL METHOD, MULTI-AREA WHITE-BALANCE CONTROL PROGRAM, COMPUTER IN WHICH MULTI-AREA WHITE-BALANCE CONTROL PROGRAM IS RECORDED, MULTI-AREA WHITE-BALANCE IMAGE-PROCESSING DEVICE, MULTI-AREA WHITE-BALANCE IMAGE-PROCESSING METHOD, MULTI-AREA WHITE-BALANCE IMAGE-PROCESSING PROGRAM, COMPUTER IN WHICH MULTI-AREA WHITE-BALANCE IMAGE-PROCESSING PROGRAM IS RECORDED, AND IMAGE-CAPTURE APPARATUS

(71) Applicant: OLYMPUS CORPORATION, Hachioji-shi, Tokyo (JP)

(72) Inventor: Kazunori Yoshizaki, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/164,438

(22) Filed: May 25, 2016

(65) Prior Publication Data
US 2016/0269707 A1 Sep. 15, 2016

Related U.S. Application Data

(63) Continuation of application No. PCT/JP2014/075436, filed on Sep. 25, 2014.

(30) Foreign Application Priority Data

Nov. 28, 2013 (JP) .................................. 2013-246475

(51) Int. Cl.
H04N 9/73 (2006.01)
H04N 9/04 (2006.01)

(52) U.S. Cl.
CPC .............. *H04N 9/735* (2013.01); *H04N 9/045* (2013.01)

(58) Field of Classification Search
CPC ...... H04N 9/735; H04N 9/045; H04N 9/3182; H04N 9/73; H04N 9/643; H04N 1/46;
(Continued)

(56) References Cited

U.S. PATENT DOCUMENTS 7,362,356 B2 * 4/2008 Ikeda ....................... H04N 9/73
348/223.1
7,450,160 B2 * 11/2008 Takahashi .............. H04N 9/735
348/223.1

(Continued)

FOREIGN PATENT DOCUMENTS

JP 2006211440 A 8/2006
JP 2007228516 A 9/2007
(Continued)

OTHER PUBLICATIONS

International Search Report (ISR) dated Dec. 16, 2014 issued in International Application No. PCT/JP2014/075436.

*Primary Examiner* — Pritham Prabhakher
(74) *Attorney, Agent, or Firm* — Holtz, Holtz & Volek PC

(57) ABSTRACT

A multi-area white-balance control device includes a component that divides an inputted image into a plurality of division areas, a component that estimates a lighting-source color temperature for each division area, a component that calculates out color information of an areal image for each division area, and a component that acquires information for white-balance processing on the basis of the lighting-source color temperature and the color information of the areal image for each division in such a manner as to weight, in the (Continued)

information for white-balance processing, a multi-area white-balance factor as more significant in reference to a single-area white-balance factor in a case where the color information has a value higher than a predetermined value, than in a case where the color information fails to have the predetermined value. Thereby, an image with natural color reproduction can be generated.

19 Claims, 10 Drawing Sheets

(58) Field of Classification Search
CPC ........ H04N 1/60; H04N 5/23219; H04N 5/76; H04N 5/222; G06K 9/00; G06K 9/00255
USPC ...................................................... 348/223.1
See application file for complete search history.

(56) References Cited

U.S. PATENT DOCUMENTS

| | | | | |
|---|---|---|---|---|
| 7,454,056 B2* | 11/2008 | Hayaishi | ............... | H04N 1/6027 348/225.1 |
| 7,542,077 B2* | 6/2009 | Miki | ....................... | H04N 9/735 348/223.1 |
| 7,643,068 B2* | 1/2010 | Hyodo | .................... | H04N 9/735 348/223.1 |
| 8,013,906 B2* | 9/2011 | Ikeda | ................. | H04N 5/23219 348/223.1 |
| 8,446,487 B2* | 5/2013 | Shimizu | ............. | H04N 5/23219 348/223.1 |
| 8,830,348 B2* | 9/2014 | Nomura | ............. | G06K 9/00255 348/223.1 |
| 2002/0122120 A1* | 9/2002 | Hsieh | ...................... | H04N 9/735 348/231.6 |
| 2006/0170789 A1* | 8/2006 | Takahashi | ............... | H04N 9/735 348/223.1 |
| 2006/0176379 A1* | 8/2006 | Hyodo | .................... | H04N 9/735 348/223.1 |
| 2007/0268380 A1* | 11/2007 | Takasumi | ............. | H04N 1/6077 348/231.1 |
| 2008/0266417 A1* | 10/2008 | Abe | ...................... | H04N 1/6077 348/223.1 |
| 2009/0021602 A1* | 1/2009 | Fujiwara | ................ | H04N 9/735 348/223.1 |
| 2010/0225780 A1* | 9/2010 | Shimizu | ............. | H04N 5/23219 348/223.1 |
| 2010/0231746 A1* | 9/2010 | Nomura | ................. | H04N 9/735 348/223.1 |
| 2011/0050950 A1* | 3/2011 | Nomura | ................. | H04N 5/235 348/224.1 |
| 2012/0281108 A1* | 11/2012 | Fukui | ..................... | H04N 5/144 348/223.1 |
| 2013/0155274 A1* | 6/2013 | Yoshino | ................. | H04N 9/735 348/223.1 |

FOREIGN PATENT DOCUMENTS

| | | |
|---|---|---|
| JP | 2008092447 A | 4/2008 |
| JP | 2010213232 A | 9/2010 |

* cited by examiner

IMAGE UNDER
SINGLE ILLUMINATION
(ILLUMINATION A)

| C | C | A | A | A | A |
| A | A | B | B | A | A |
| A | A | A | A | A | A |
| A | A | C | C | C | A |
| A | A | A | A | A | A |
| A | A | A | A | D | A |

ESTIMATED RESULT OF
MULTI-AREA LIGHTING-SOURCE
COLOR TEMPERATURE
(ILLUMINATION A, B, C OR D
ESTIMATED)

FIG.4

| 0.1 | 0.1 | 0.1 | 0.1 | 0.1 | 0.1 |
|-----|-----|-----|-----|-----|-----|
| 0.2 | 0.2 | 0.1 | 0.2 | 0.2 | 0.2 |
| 0.4 | 0.2 | 0.2 | 0.1 | 0.1 | 0.1 |
| 0.2 | 0.2 | 0.2 | 0.1 | 0.1 | 0.1 |
| 0.1 | 0.3 | 0.1 | 0.2 | 0.1 | 0.1 |
| 0.2 | 0.1 | 0.1 | 0.2 | 0.1 | 0.1 |

VALUE OF SATURATION: 0~1
AVERAGE VALUE
OF SATURATION A: 0.15
STANDARD DEVIATION
OF SATURATION S: 0.07

FIG.6

| Gc | Gc | Ga | Ga | Ga | Ga |
|----|----|----|----|----|----|
| Ga | Ga | Gb | Gb | Ga | Ga |
| Ga | Ga | Ga | Ga | Ga | Ga |
| Ga | Ga | Gc | Gc | Gc | Ga |
| Ga | Ga | Ga | Ga | Ga | Ga |
| Ga | Ga | Ga | Ga | Gd | Ga |

MULTI-AREA WB COEFFICIENT

FIG.7

| ESTIMATED RESULT OF LIGHTING-SOURCE COLOR TEMPERATURE | WB COEFFICIENT 1 | WB COEFFICIENT 2 |
|---|---|---|
| A | 0.8 | 1.1 |
| B | 0.9 | 1.0 |
| C | 1.0 | 0.9 |
| D | 1.1 | 0.7 |

MULTI-AREA WHITE-BALANCE CONTROL DEVICE, MULTI-AREA WHITE-BALANCE CONTROL METHOD, MULTI-AREA WHITE-BALANCE CONTROL PROGRAM, COMPUTER IN WHICH MULTI-AREA WHITE-BALANCE CONTROL PROGRAM IS RECORDED, MULTI-AREA WHITE-BALANCE IMAGE-PROCESSING DEVICE, MULTI-AREA WHITE-BALANCE IMAGE-PROCESSING METHOD, MULTI-AREA WHITE-BALANCE IMAGE-PROCESSING PROGRAM, COMPUTER IN WHICH MULTI-AREA WHITE-BALANCE IMAGE-PROCESSING PROGRAM IS RECORDED, AND IMAGE-CAPTURE APPARATUS

This application is a continuation of PCT International Application No. PCT/JP/2014/075436, filed on Sep. 25, 2014, and claims the benefit of Japanese Patent Application No. 2013-246475 filed in Japan on Nov. 28, 2013. The contents of PCT International Application No. PCT/JP/2014/075436 and Japanese Patent Application No. 2013-246475 are incorporated herein by reference.

BACKGROUND OF THE INVENTION

1) Field of the Invention

The present invention relates to a multi-area white-balance control device, a multi-area white-balance control method, a multi-area white-balance control program, a computer in which a multi-area white-balance control program is recorded, a multi-area white-balance image-processing device, a multi-area white-balance image-processing method, a multi-area white-balance image-processing program, a computer in which a multi-area white-balance image-processing program is recorded, and an image-capture apparatus provided with a multi-area white-balance image-processing device for achieving color reproduction without unnaturalness over the entirety of an image that is captured of a scene lighted by a plurality of light sources, by estimating color temperature for each of areas into which the image is divided and performing white-balance correction.

2) Description of Related Art

A photographic lighting source changes its color temperature depending on solar altitude, atmosphere conditions etc., for example in the daytime outdoors. In addition, the color temperature differs depending on whether the place is sunny or shady.

Regarding indoor photography, there are various types of artificial lighting such as by a fluorescent lamp, an incandescent lamp, etc. which are different in color temperature.

When flash is used in photographing outdoors in the daytime, mixture of the flash light and the natural light forms a photographic lighting source.

When flash is used in photographing outdoors in the nighttime, the flash light and the background artificial light are not mixed, but the color temperature of lighting in the very scene varies with areas in the scene.

When flash is used in photographing indoors, the flash light and the artificial light are mixed to form a photographic lighting source.

Under the various conditions of photographic lighting source as stated above, human eyesight causes color adaptation. That is, according to the human eyesight, a white object in the area of attention is sensed white irrespective of whether the light source is sunlight, artificial light, or mixed light of these. In conformance with this characteristic of the human eyesight, a camera as an input device is configured to control RGB gains, to perform so called "white balance" processing.

However, since a camera cannot know the photographic lighting source before shooting, upon the type of photographic lighting (color temperature of the photographic lighting source) being assumed on the basis of an image captured by photographing or being designated by a user, correction of the white balance over the entire image is made in conformance with this type of lighting, in general.

In a case where the scene about an object is lighted by a plurality of light sources, in order to highly accurately perform white-balancing over the entire image irrespective of color temperature of the photographic lighting source in the areas in the scene, it is necessary, upon dividing the acquired image into a plurality of division areas, to detect color temperature of the photographic lighting source for individual division areas and perform different white-balance processing.

Regarding a conventional method of white-balance processing for an image captured by photographing a scene lighted by a plurality of light sources, Japanese Patent KOKAI No. 2010-213232 for example discloses: dividing a frame for image capture into a plurality of regions in accordance with lightness information and color information; setting white-balance correction coefficients differing with the plurality of regions; and generating white-balance correction coefficients for the entire frame for image capture upon setting a white-balance correction coefficient limit for limiting, within a predetermined range, differences among the plurality of white-balance correction coefficients for individual plurality of regions; for the purpose of solving the problem that a plurality of illumination areas derived from different kinds of light sources in one frame for image capture make it difficult to achieve appropriate white balance over the entire frame for image capture and thus generate a color shift in a captured image.

SUMMARY OF THE INVENTION

A multi-area white-balance control device according to the embodiments of the present invention includes an area divider that divides an inputted image into a plurality of division areas, a lighting-source color-temperature estimator that estimates a lighting-source color temperature in each of the division areas, an areal-image color-information calculator that calculates out color information of an areal image for each of the division areas, and a white-balance controller that acquires information for white-balance processing for each of the division areas on the basis of the lighting-source color temperature in each of the division areas estimated by the lighting-source color-temperature estimator and the color information of the areal image for each of the division areas calculated out by the areal-image color-information calculator. In acquiring the information for white-balance processing for each of the division areas, the white-balance controller considers at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

Also, a multi-area white-balance control method according to the embodiments of the present invention includes dividing an inputted image into a plurality of division areas, estimating a lighting-source color temperature in each of the division areas, calculating out color information of an areal image for each of the division areas, and acquiring information for white-balance processing for each of the division areas on the basis of the lighting-source color temperature in each of the division areas estimated and the color information of the areal image for each of the division areas calculated out. The acquisition of the information for white-balance processing for each of the division areas includes considering at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

Also, a computer according to the embodiments of the present invention in which a multi-area white-balance control program is recorded is provided in a multi-area white-balance control device. By the multi-area white-balance control program, the computer is made to function as an area divider that divides an inputted image into a plurality of division areas, a lighting-source color-temperature estimator that estimates a lighting-source color temperature in each of the division areas, an areal-image color-information calculator that calculates out color information of an areal image for each of the division areas, and a white-balance controller that acquires information for white-balance processing for each of the division areas on the basis of the lighting-source color temperature in each of the division areas estimated by the lighting-source color-temperature estimator and the color information of the areal image for each of the division areas calculated out by the areal-image color-information calculator. In acquiring the information for white-balance processing for each of the division areas, the white-balance controller considers at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

Also, a multi-area white-balance control program according to the embodiments of the present invention is readable by a computer provided in a multi-area white-balance control device. The multi-area white-balance control program is configured to make the computer function as an area divider that divides an inputted image into a plurality of division areas, a lighting-source color-temperature estimator that estimates a lighting-source color temperature in each of the division areas, an areal-image color-information calculator that calculates out color information of an areal image for each of the division areas, and a white-balance controller that acquires information for white-balance processing for each of the division areas on a basis of the lighting-source color temperature in each of the division areas estimated by the lighting-source color-temperature estimator and the color information of the areal image for each of the division areas calculated out by the areal-image color-information calculator. In acquiring the information for white-balance processing for each of the division areas, the white-balance controller considers at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

The embodiments of the present invention can provide, in the configuration where an entire photographic image is to be divided into a plurality of division areas and color temperatures in the individual division areas are estimated, a multi-area white-balance control device, a multi-area white-balance control method, a multi-area white-balance control program, a computer in which a multi-area white-balance control program is recorded, a multi-area white-balance image-processing device, a multi-area white-balance image-processing method, a multi-area white-balance image-processing program, a computer in which a multi-area white-balance image-processing program is recorded, and an image-capture apparatus provided with a multi-area white-balance image-processing device that make it possible to generate an image free from unnatural color reproduction even if estimated color temperatures of light source in the individual division areas involve errors.

Features and advantages of the present invention will become apparent from the following detailed description of the preferred embodiments when taken in conjunction with the accompanying drawings.

BRIEF DESCRIPTION OF THE DRAWINGS

FIG. 1A shows one example of the inputted image divided into 6×6 division areas, and FIG. 1B is an explanatory diagram that shows one example of lighting-source color temperature estimated for each of the division areas.

FIG. 4. is an explanatory diagram that shows one example of saturation information of areal images calculated out by the areal-image color-information calculator upon an inputted image being divided into a division areas in the multi-area white-balance control device of FIG. 2.

FIG. 6. is an explanatory diagram that shows one example of white-balance coefficients for the individual division areas generated by the multi-area white-balance coefficient generator provided in the white-balance controller in the multi-area white-balance control device of FIG. 5.

FIG. 7. is an explanatory diagram that shows one example of lookup table in which there are recorded respective white-balance coefficients associated with estimated lighting-source color temperatures, to be applicable, on the occasion of generating respective white-balance coefficients, by the respective white-balance coefficient generators provided in the white-balance controller in the multi-area white-balance control device of FIG. 5.

DETAILED DESCRIPTION OF THE PREFERRED EMBODIMENTS

Preceding the explanation of the embodiments, the function and effect of the present invention will be explained.

According to the present invention, an inputted image is divided into a plurality of division areas, lighting-source color temperature for each division area is estimated, color information of areal image for each division area is calculated out, and information for white-balance processing is acquired on the basis of the estimated lighting-source color temperature and the calculated color-information of areal image for each division area. The information for white-balance processing is acquired upon at least one of a multi-area white-balance factor and a single-area white-balance factor being considered in such a manner that the multi-areal white-balance factor is weighted as more significant in a case where the color information of areal image for a division area has a value higher than a predetermined value, than in a case where the color information of areal image for the division area fails to have a value higher than the predetermined value. This configuration of the present invention makes it possible to acquire much appropriate information for white-balance processing even if the estimated lighting-source color temperature in a certain division area is wrong. As a result, when the white-balance processing is performed for the entirety of the inputted image on the basis of the appropriate information for white-balance processing for the individual areas, it is possible to generate an image free from unnatural color reproduction at the concerned division area in the entirety of the inputted image.

The modes for embodying the present invention are explained below in reference to the drawings. The following modes of embodiment do not limit the claimed scope for a patent according to the present invention.

First Embodiment

Figure 2:
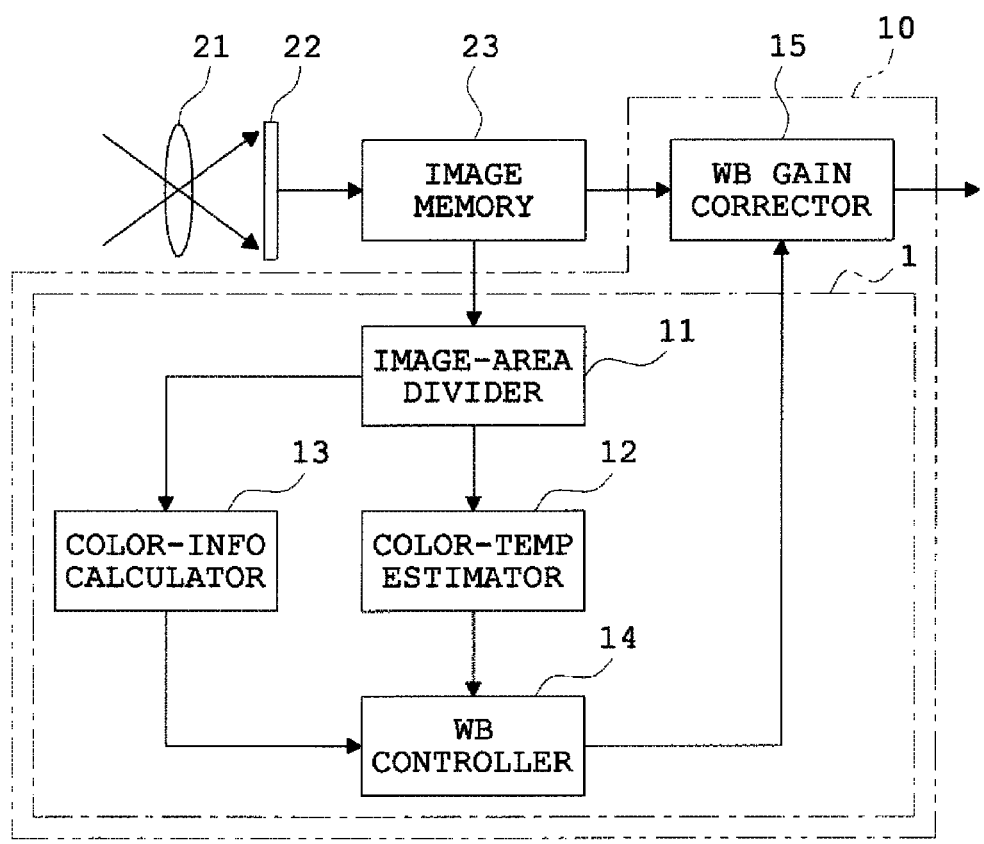
FIG. 2. is a block diagram of a digital camera provided with a multi-area white-balance control device according to the first embodiment of the present invention.

FIG. 2 is a block diagram of a digital camera provided with a multi-area AWB (Auto White Balance) control device according to the first embodiment of the present invention. In FIG. 2, the part enclosed with a single dot & dash line is the multi-area white-balance control device according to this embodiment, and the part enclosed with a double dot and dash line is a structure corresponding to a multi-area white-balance image processing device.

The multi-area white-balance control device 1 of this embodiment has, as shown in FIG. 2, an image-area divider 11 (area divider), a color-temperature estimator 12 (lighting-source color-temperature estimator), a color-information calculator 13 (areal-image color-information calculator), and a white-balance controller 14. In FIG. 2, the reference numeral 10 denotes a white-balance image processing device, the reference numeral 15 denotes a WB (White-Balance) gain corrector as a white-balance processor, the reference numeral 21 denotes a lens, the reference-numeral 22 denotes an image sensor, and the reference numeral 23 denotes an image memory in which an image captured by the image sensor 22 is stored. The digital camera provided with the multi-area white-balance control device 1 of this embodiment has a control section not shown in the drawing. The control section is provided with the function of storing the image, which is captured by the image sensor 22 in accordance with an order to photograph, into the image memory 23 and the function of inputting the image stored in the image memory 23 independent of each other.

The image-area divider 11 divides the inputted image into a plurality of blocks having a predetermined size.

The color-temperature estimator 12 estimates the lighting-source color temperature in each of the division blocks (areas) formed by the image-area divider 11. The color-temperature estimator 12 further estimates the lighting-source color temperature in the single area on the basis of the lighting-source color temperatures in the individual division areas. The detail of estimate of the lighting-source color temperature is explained later.

The areal-image color-information calculator calculates out the color information of the areal image for each of the division blocks (areas). The detail of calculation of the color information of the areal image is explained later.

The WB controller 14 acquires information for white-balance processing for each of the division areas on the basis of the lighting-source color temperature in each of the division areas estimated by the color-temperature estimator 12 and the color information of the areal image for each of the division areas calculated out by the areal-image color-information calculator 13. In acquiring the information for white-balance processing for each of the division areas, the WB controller 14 considers at least one of a multi-area white-balance factor and a single-area white-balance factor in such a manner as to weight the multi-area white-balance factor as more significant in a case where the color information of the areal image for each of the division areas has a value higher than a predetermined value, than in a case where the same fails to have a value higher than the predetermined value. The detail of acquisition of the information for white-balance processing is explained later.

The WB gain corrector 15 corrects white balance of the entire inputted image on the basis of the information for white-balance processing acquired by the WB controller 14. An explanation is made of the flow of processing up to acquisition of the information for white-balance processing from the inputted image using the multi-area white-balance control device of this embodiment thus configured.

First, the control section of the digital camera not shown in the drawing inputs image data stored in the image memory 23.

Then, the image-area divider 11 divides the inputted image data into a plurality of blocks of a predetermined size. For convenience's sake, the following explanation is made on the assumption that the image data is divided into 6×6 blocks.

Then, the color-temperature estimator 12 estimates the lighting-source color temperature for the individual blocks, into which the inputted image has been divided by the image-area divider 11, for example in the way described below.

The following argument is made on the assumption that the image sensor has effective pixels of 4800×3600. The inputted RAW image in Bayer pattern is divided into 6×6 blocks by the image-area divider 11, so that each of the blocks has 800×600 pixels.

Preceding the estimate of the lighting-source color temperature, each block of 800×600 pixels is further divided into, as sampling points, pixel ranges each containing, for example, 20×20 pixels, and, by finding an average of pixel values of each of R, G, B pixels in each pixel range containing 20×20 pixels, pixel data for each of R, G, B pixels with sampling points as down-sampled 40×30 pixels are acquired for each block.

Figure 3:
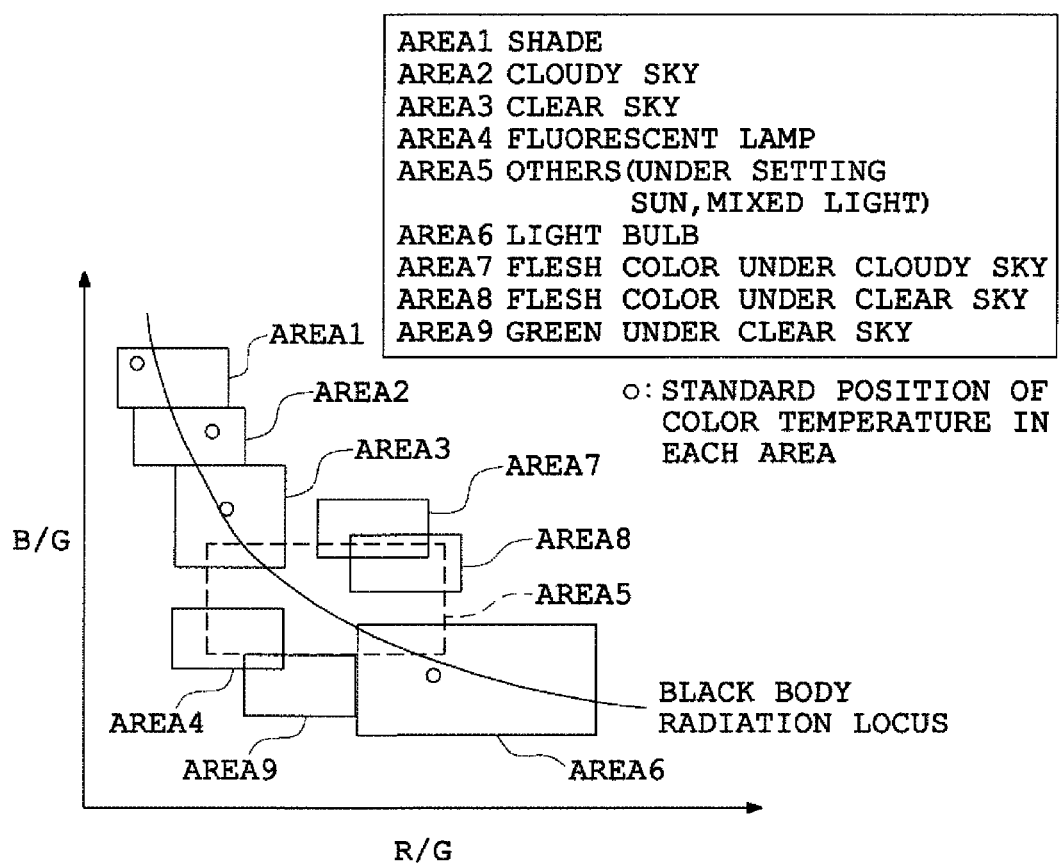
FIG. 3. shows one example of color-temperature determination criterion in the form of color-temperature reference areas presented in a R/G-B/G color diagram, on which every pixel in image data should be plotted to determine its color temperature in estimating the lighting-source color temperature from color distribution of the image of the object.

For each of the sampling points as 40×30 pixels, a chromatic value (R/G, B/G) is determined and is plotted, for example on a color diagram as shown in FIG. 3. Then, using a color-temperature determination criterion presented in FIG. 3 as color-temperature reference areas corresponding to various lighting conditions, determination of lighting-source color temperature for every sampling point is made, and plotted points residing within each of the color-temperature reference areas are summed up. In consideration of the order of total number of plotted points residing within the respective color-temperature reference areas, the lighting-source color temperature for each block is estimated for example according to the conditions shown in Table 1 below.

TABLE 1

| condition | estimated result of lighting-source color temperature |
| --- | --- |
| A center of gravity among plotted points that reside in either of a color-temperature reference area containing a largest number of plotted points (1st area) and a color-temperature reference area containing a second largest number of plotted points (2nd area) is positioned in the 1st area. | (a) the color temperature corresponding to the 1st area |
| A center of gravity among plotted points that reside in either of a color-temperature reference area containing a largest number of plotted points (1st area) and a color-temperature reference area containing a second largest number of plotted points (2nd area) is positioned in the 2nd area. | (b) the color temperature corresponding to the 2nd area |
| A center of gravity among plotted points that reside in either of a color-temperature reference area containing a largest number of plotted points (1st area) and a color-temperature reference area containing a second largest number of plotted points (2nd area) is positioned in a color-temperature reference area other than the 1st and 2nd areas. | (c) a color temperature corresponding to a color-temperature reference area that contains a center of gravity among plotted points residing in any of all the color-temperature reference areas |

Figures 1A, 1B:
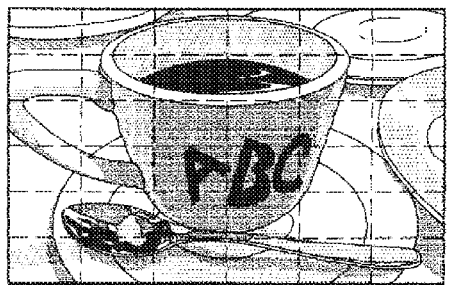
FIGS. 1A and 1B are explanatory diagrams that show one example of estimated result of the lighting-source color temperature in a case where an inputted image is divided into a plurality of division areas, where

Using this method, the color-temperature estimator 12 estimates lighting-source color temperatures in all of the thirty six blocks. Thereby, the estimated result of lighting-source color temperatures over the entire image are acquired, for example as shown in FIG. 1B.

If the lighting-source color temperatures in all the blocks are estimated in this way, while the estimated results for most of the blocks are appropriate, they may be wrong in some blocks. In a case where the size of each block is small, the probability of object image being locally occupied by a single color is high, and, as a result, estimate of the lighting-source color temperature by the color-temperature estimator 12 is prone to be wrong.

At the same time as the areal-image color-temperature estimator 12 estimates lighting-source color temperature, the color-information calculator 13 calculates out color information of areal image for each block, for example according to the method explained below.

FIG. 4. is an explanatory diagram that shows one example of saturation information of areal images calculated out by the areal-image color-information calculator 13.

In the example of FIG. 4, the areal-image color-information calculator 13 calculates out a value of saturation for each of the 6×6 blocks, into which the inputted image has been divided by the image-area divider 11.

A value of saturation can be found by converting RGB information from the RAW image in Bayer pattern into coordinates for example in a color space representing hue (H), saturation (S) and value (V). For example, if RGB are inputted values regulated in the range of 0 to 1 and, of three inputted values R, G and B, the largest one is defined as MAX and the smallest one is defined as MIN, HSV can be expressed by the following expressions:

$$H = \begin{cases} 60 \times \frac{G-B}{MAX-MIN} + 0, & \text{if } MAX = R \\ 60 \times \frac{B-R}{MAX-MIN} + 120, & \text{if } MAX = G \\ 60 \times \frac{R-G}{MAX-MIN} + 240, & \text{if } MAX = B \end{cases}$$

Further, $H \mathrel{+}= 360$, if $H < 0$ $$S = \frac{MAX - MIN}{MAX}$$

$$V = MAX$$

The areal-image color information calculator 13 may be configured to calculate out average value of saturation or standard deviation of saturation as saturation information. Also, it may be configured to calculate out, as saturation information, flatness index disclosed by JP KOKAI No. 2008-092447 regarding saturation over the entire image frame as indicating whether each pixel is a flat region in which data variation is within a predetermined range.

Figure 5:
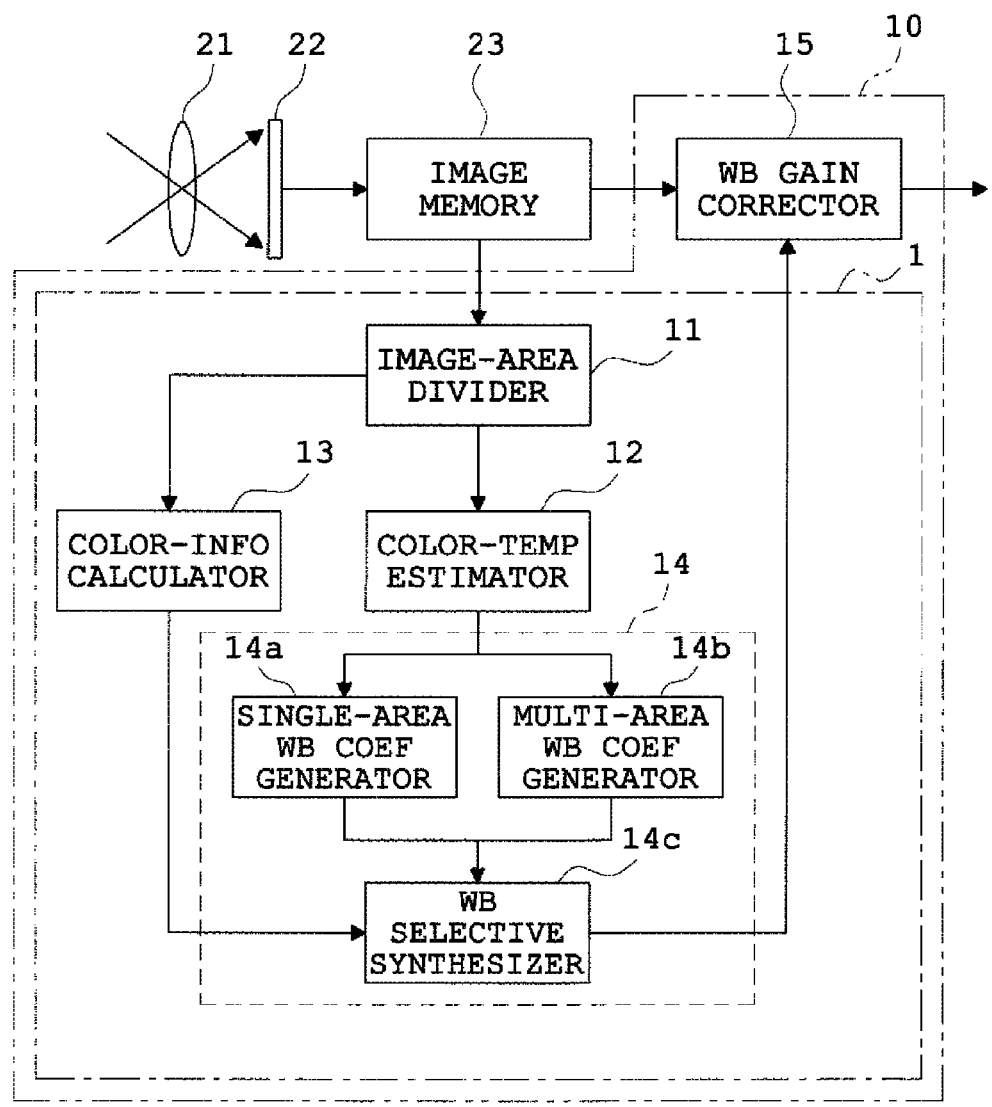
FIG. 5. is an explanatory diagram that shows one example of the detailed structure of the white-balance controller in the multi-area white-balance control device of FIG. 2.

Then, the WB controller 14 acquires information for white-balance processing on the basis the lighting-source color temperature in each of the division areas estimated by the color-temperature estimator 12 and the color information of the areal image for each of the division areas calculated out by the areal-image color-information calculator 13. FIG. 5 is an explanatory diagram that shows one example of the detailed structure of the WB controller 14 in the multi-area white-balance control device of FIG. 2.

The WB controller 14 of FIG. 5 is constructed of a single-area WB coefficient generator 14a (single-area white-balance coefficient generator), a multi-area WB coefficient generator 14b (multi-area white-balance coefficient generator), and a WB selective synthesizer 14c (white-balance coefficient synthesizer).

The single-area WB coefficient generator 14a generates a single-area white-balance coefficient on the basis of the lighting-source color temperature in each division area estimated by the color-temperature estimator 12.

To be specific, the color-temperature estimator 12 estimates a single-area lighting-source color temperature for example according to the conditions shown in Table 2 below, upon using, for example, the lighting-source color temperatures estimated for individual division areas as shown in FIG. 1B. The single-area WB coefficient generator 14a generates a single-area white-balance coefficient on the basis of the single-area lighting-source color temperature estimated by the color-temperature estimator 12.

TABLE 2

| condition | estimated result of lighting-source color temperature |
|---|---|
| A center of gravity among division areas that have either of an estimated lighting-source color temperature given to a largest number of division areas (1st color temperature) and an estimated lighting-source color temperature given to a second largest number of division areas (2nd color temperature) is positioned in a division area having the 1st color temperature. | (a) the 1st color temperature |
| A center of gravity among division areas that have either of an estimated lighting-source color temperature given to a largest number of division areas (1st color temperature) and an estimated lighting-source color temperature given to a second largest number of division areas (2nd color temperature) is positioned in a division area having the 2nd color temperature. | (b) the 2nd color temperature |
| A center of gravity among division areas that have either of an estimated lighting-source color temperature given to a largest number of division areas (1st color temperature) and an estimated lighting-source color temperature given to a second largest number of division areas (2nd color temperature) is positioned in a division area having a color temperature other than the 1st and 2nd color temperatures. | (c) a color temperature estimated for a division area that contains a center of gravity among all of the division areas |

If a function for generating a white-balance coefficient is represented by G, a single-area lighting-source color temperature found by use of lighting-source color temperatures estimated for individual division areas is represented by A, and a single-area white-balance coefficient is represented by Ga.

The multi-area WB coefficient generator 14b generates multi-area white-balance coefficients on the basis of the lighting-source color temperatures in the individual division areas estimated by the color-temperature estimator 12.

To be specific, the multi-area WB coefficient generator 14b generates, for example, multi-area white-balance coefficients Ga, Gb, Gc as shown in FIG. 6 using, for example, lighting-source color temperatures estimated by the color-temperature estimator 12 for individual areas as shown in FIG. 1B.

Regarding the function G for expressing the white-balance coefficients generated by the respective WB coefficient generators 14a and 14B on the basis of the lighting-source color temperatures in the individual division areas estimated by the color-temperature estimator 12, it may be either a mathematical expression or a lookup table in which numerical values are recorded. FIG. 7 shows one example of lookup table in which there are recorded respective white-balance coefficients associated with estimated lighting-source color temperatures, to be applicable, on the occasion of generating respective white-balance coefficients, by the respective WB coefficient generators 14a and 14b provided in the WB controller 14 in the multi-area white-balance control device of FIG. 5.

The WB selective synthesizer 14c calculates out a white-balance coefficient by synthesizing a multi-area white-balance coefficient generated by the multi-area WB coefficient generator 14b and a single-area white-balance coefficient generated by the single-area WB coefficient generator 14a. In calculating out a white-balance coefficient, the WB selective synthesizer 14c synthesizes the multi-area white-balance coefficient and the single-area white-balance coefficient in such a manner that a component ratio of the multi-area white-balance coefficient increases according as a value of the color information of the areal image of the corresponding division area calculated out by the areal-image color information calculator 13 increases.

Figure 8A:
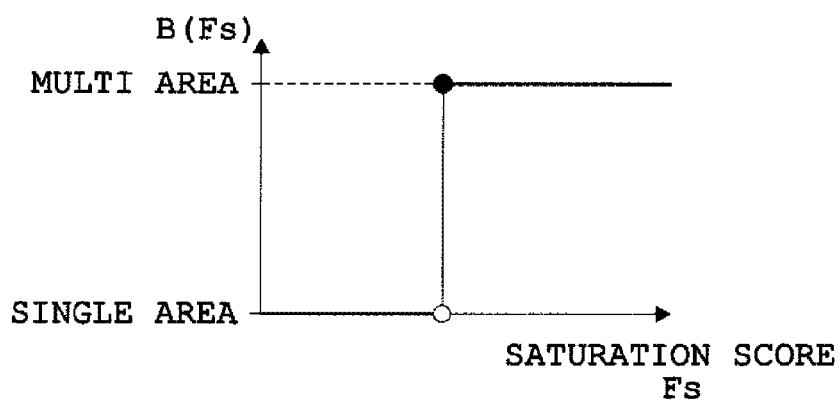
FIGS. 8A and 8B are explanatory diagrams that show the concept of component ratio in synthesizing a multi-area white-balance coefficient and a single-area white-balance coefficient by the multi-area white-balance controller in the multi-area white-balance control device of FIG. 5.
Figure 8B:
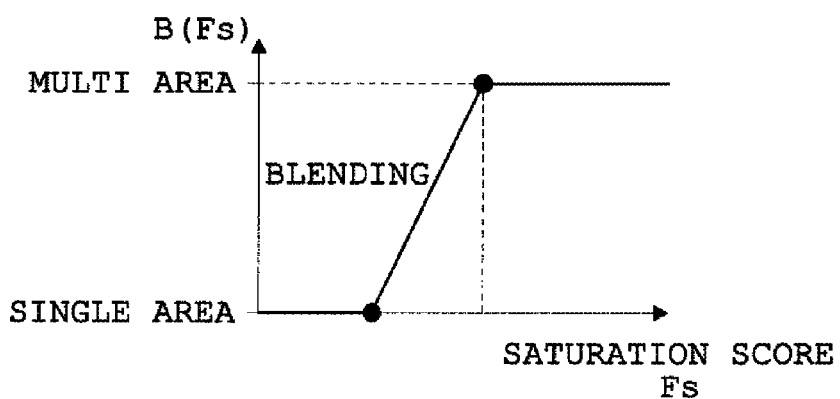

For example, on the occasion of calculating out a white-balance coefficient, the WB selective synthesizer 14 is configured to determine the component ratio of the multi-area white-balance coefficient in synthesizing it with the single-area white-balance coefficient on the basis of the saturation score, as the saturation information, as shown in FIGS. 8A and 8B.

To be specific, in the examples of FIGS. 8A and 8B, the WB selective synthesizer 14c selects at least one of the multi-area white-balance coefficient and the single-area white-balance coefficient on the basis of the saturation score Fs of the corresponding division area calculated out by the color-information estimator 13. In the example of FIG. 8A, the white-balance selective synthesizer 14c selects the multi-area white-balance coefficient in a case of saturation score Fs being higher than a predetermined value, whereas the white-balance selective synthesizer 14c selects the single-area white-balance coefficient in a case of saturation score Fs being equal to or lower than the predetermined value. In the example of the FIG. 8B, the WB selective synthesizer 14c selects the multi-area white-balance coefficient in a case of saturation score Fs being higher than a predetermined first value, selects the single-area white-balance coefficient in a case of saturation score Fs being lower than a predetermined second value that is lower than the predetermined first value, and synthesizes the multi-area white-balance coefficient and the single-area white-balance coefficient in such a manner as to weight them according to the value of the saturation score Fs in a case of the saturation score Fs being between the predetermined first value and the predetermined second value, to determine the white-balance coefficient for the division area.

The saturation score Fs can be calculated out for example by the following equation using the average value of saturation As, the standard deviation of saturation Ss.

$$Fs(As, Ss) = As * \alpha + Ss * \beta$$

where $\alpha$ and $\beta$ are adjusting coefficients. The WB selective synthesizer 14 raises the component ratio of the multi-area white-balance coefficient according as the saturation score increases. On the other hand, if the saturation score Fs is low, the WB selective synthesizer weights the single-area white-balance coefficient as significant as shown in FIGS. 8A and 8B for the purpose of preventing errors in multi-area white-balance processing as much as possible for an image having a low saturation.

If an image occupied by a wide area of low saturation is divided into a plurality of division areas and lighting-source color temperatures are estimated for the individual division areas, a patch pattern is likely to appear in the processed image because of wrong estimation of the lighting-source color temperature, and is more conspicuous than in a case where an image has a wide area of high saturation. Therefore, the WB selective synthesizer 14c selects the single-area white balance coefficient for an image occupied by a wide area of low saturation.

On the other hand, for an image occupied by a wide area of high saturation, the WB selective synthesizer 14c selects the multi-area white-balance coefficient.

In this embodiment, the saturation score Fs is calculated out from the average value of saturation As and the standard deviation of saturation Ss. However, not limited to this calculation method, any method that can evaluate saturation is available.

A white-balance coefficient for a division area G (area), which is finally applied as information for white-balance processing, is calculated out using the following expression:

$$G(area)=G(single)*(1-B(Fs))+G(multi)*B(Fs)$$

where G (single) is a single-area white-balance coefficient, G (multi) is a multi-area white-balance coefficient, Fs is a saturation score, and B is a component ratio of the multi-area white-balance coefficient in synthesis.

After the WB selective synthesizer 14c completes calculation of white-balance coefficients for all the division areas, the WB gain corrector 15 performs white-balance processing for the digital image data stored in the image memory 23 and inputted by the control section not shown in the drawings, by subjecting pixel values of individual colors to white-balance processing using the white-balance coefficients corresponding to positions in the inputted image. Thereby, the white-balance correction over the entire inputted image is made.

Figure 9:
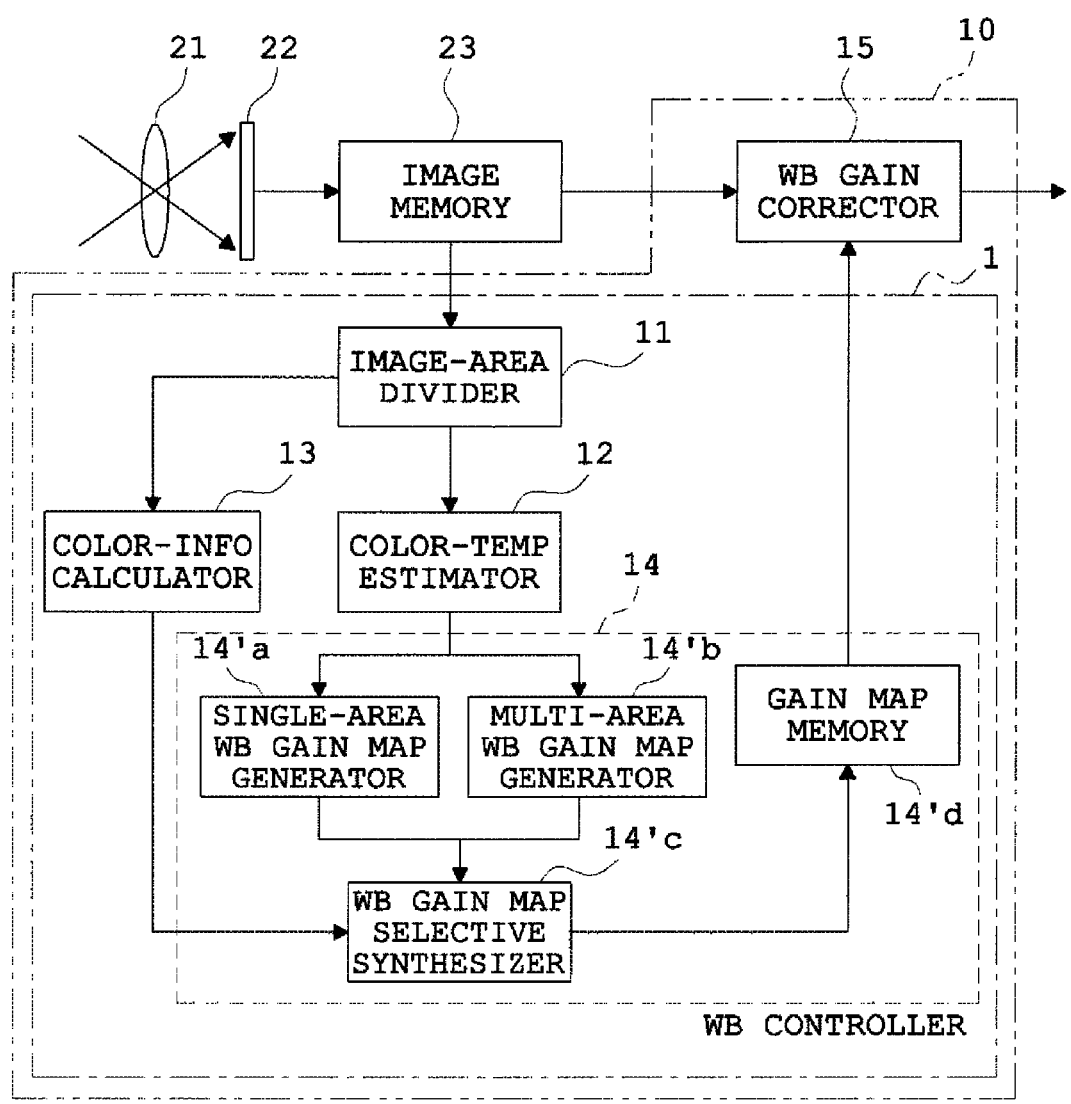
FIG. 9 is an explanatory diagram that shows the detailed configuration of a modified example of the white-balance controller in the multi-area white-balance control device of FIG. 2.

In reference to FIGS. 5 to 7, the above explanation is made of an example in which the WB controller 14 acquires white-balance coefficients as information for white-balance processing. However, information for white-balance processing to be acquired by the WB controller 14 is not limited to this. As shown in FIG. 9, the configuration may be made so that the WB controller 14 generates a white-balance gain map instead of a white-balance coefficient.

According to the example of FIG. 9, the WB controller 14 is configured to have a single-area WB gain map generator 14'a (single-area white-balance gain map generator), a multi-area WB gain map generator 14'b (multi-area white-balance gain map generator), and a WB gain map selective synthesizer 14'c (white-balance gain map selective synthesizer). In FIG. 9, the reference numeral 14'd denotes a gain map memory that stores a white-balance gain map synthesized by the WB gain map selective synthesizer 14'c.

The single-area WB gain map generator 14'a generates a single-area white-balance gain map on the basis of lighting-source color temperatures of individual division areas estimated by the color-temperature estimator 12.

The multi-area WB gain map generator 14'b generates multi-area white-balance gain maps on the basis of the lighting-source color temperatures in the individual division areas estimated by the color-temperature estimator 12.

The WB gain map selective synthesizer 14'c generates a white-balance gain map by synthesizing a single-area white-balance gain map generated by the single-area WB gain map generator 14'a and a multi-area white-balance gain map generated by the multi-area WB gain map generator 14'b.

The white-balance gain map generated by the WB gain map selective synthesizer 14'c is stored in the gain map memory 14'd. Then, the WB gain corrector 15 performs white-balance processing for the digital image data stored in the image memory 23 and inputted by the control section not shown in the drawings. The WB gain corrector 15 is configured, in performing the white-balance processing, to apply a white-balance gain map as magnifying it with interpolation. The configuration may be made so that boundary portions are subjected to smoothing in magnification.

Second Embodiment

Figure 10:
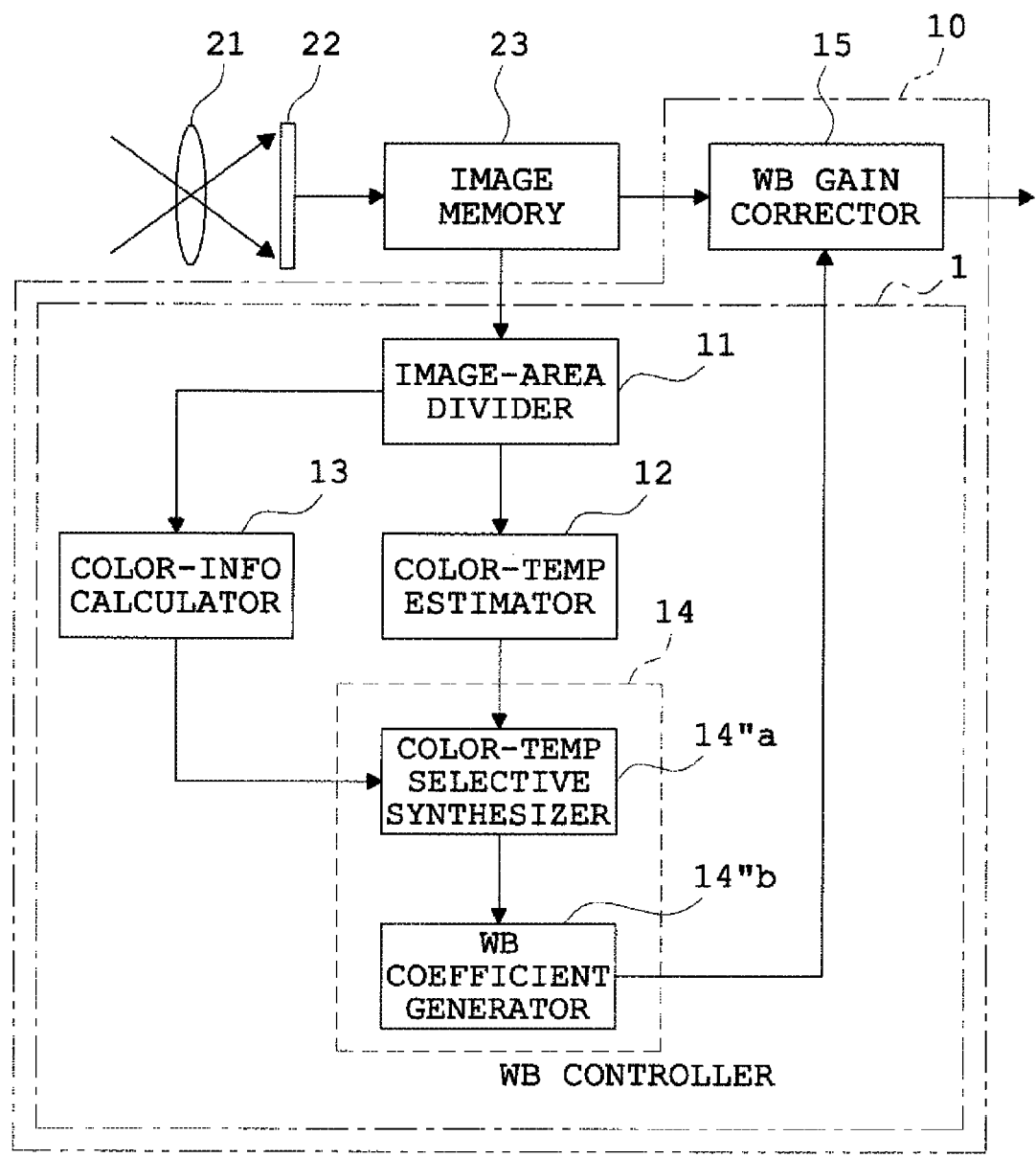
FIG. 10 is a block diagram of a digital camera provided with a multi-area white-balance control device according to the second embodiment of the present invention.

FIG. 10 is a block diagram of a digital camera provided with a multi-area white-balance control device according to the second embodiment of the present invention.

The multi-area white-balance control device 1 of this embodiment is configured to calculate out an adjusted lighting-source color temperature in each division area by synthesizing an estimated lighting-source color temperature in each division area estimated by the color-temperature estimator 12 and an estimated, single-area lighting-source color temperature acquired on the basis of the estimated lighting-source color temperatures in the individual division areas, and to calculate out a white-balance coefficient on the basis of the adjusted lighting-source color temperature in each division as calculated out.

To be specific, the WB controller 14 is constructed of a color-temperature selective synthesizer 14"a (color-temperature synthesizer) and a WB coefficient generator 14"b (white-balance coefficient generator).

The color-temperature selective synthesizer 14"a calculates out an adjusted lighting-source color temperature in each division area by synthesizing an estimated lighting-source color temperature in each division area estimated by the color-temperature estimator 12 and an estimated, single-area lighting-source color temperature acquired on the basis of the estimated lighting-source color temperatures in the individual division areas.

In synthesizing the estimated lighting-source color temperature in each division area as shown in FIG. 1B and the single-area lighting-source color temperature calculated out from the estimated lighting-source color temperatures in the individual division areas, the color-temperature selective synthesizer 14"a uses, for example, a component-ratio correlation in synthesis as shown in FIG. 8A or FIG. 8B and a value of saturation information Fs calculated out by the areal-image color-information calculator 13. For example, the component ratio of the estimated lighting-source color temperature in each division area is made to increase according as a value of saturation information increases.

The WB coefficient generator 14"b generates a white-balance coefficient on the basis of the adjusted lighting-source color temperature in each division area calculated out by the color-temperature selective synthesizer 14"a.

The other configurations and functions and effects are substantially the same as the multi-area white-balance control device 1 according to the example of FIGS. 5-7.

Figure 11:
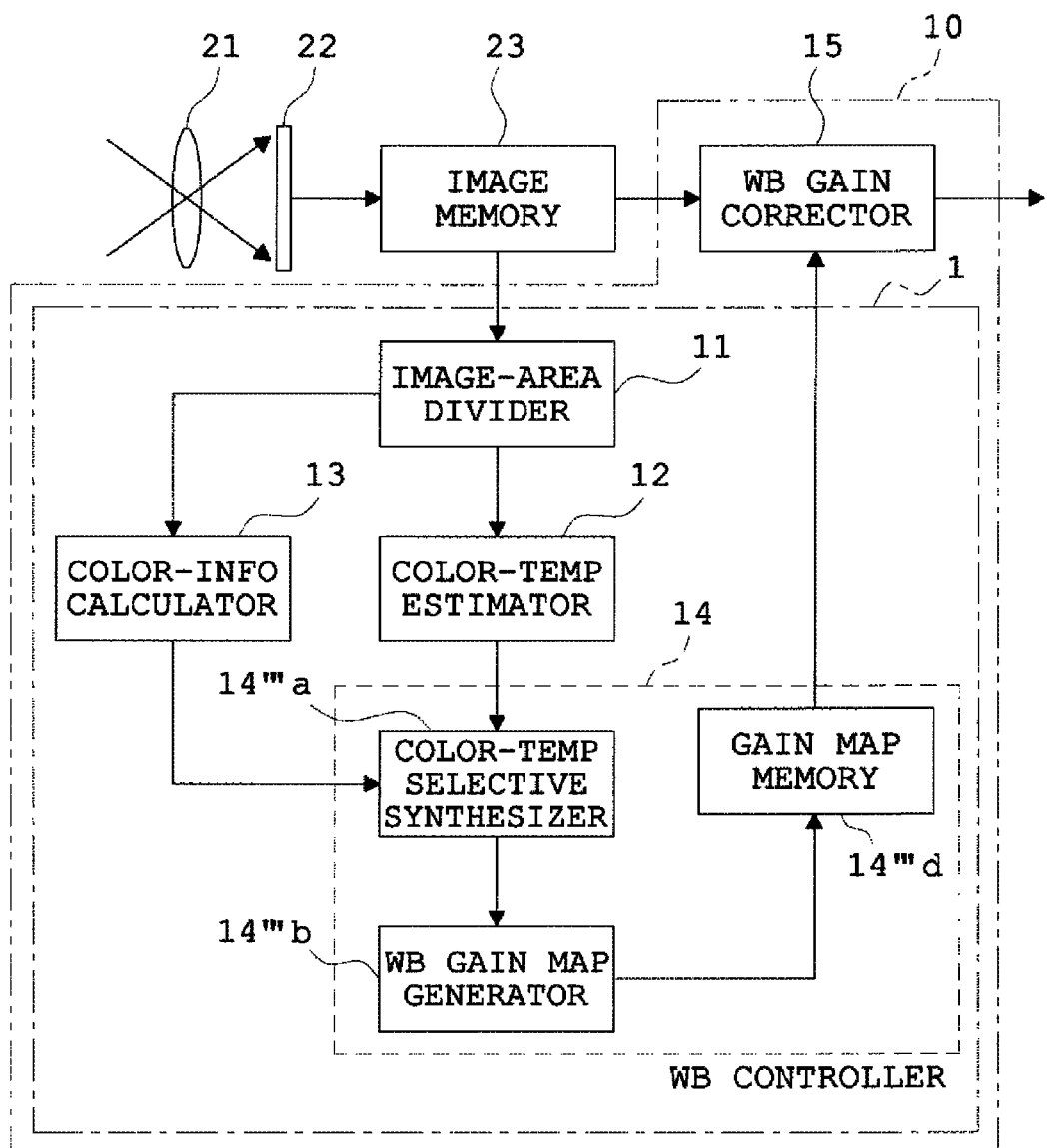
FIG. 11 is an explanatory diagram that shows one example of the detailed configuration of the white-balance controller in the multi-area white-balance control device of FIG. 10.

The WB controller 14 may be configured, as shown in FIG. 11, to generate a white-balance gain map instead of a white-balance coefficient.

According to the example of FIG. 11, the WB controller 14 is configured to have a color-temperature selective synthesizer 14'''a (color-temperature synthesizer) and a WB gain map generator 14'''b (white-balance gain map generator). In FIG. 11, the reference numeral 14'''d denotes a gain map memory that stores a white-balance gain map generated by the WB gain map generator 14'''b.

The white-balance gain map generated by the WB gain map generator 14'''b is stored in the gain map memory 14'''d. Then, the WB gain corrector 15 performs white-balance processing for the digital image data stored in the image memory 23 and inputted by the control section not shown in the drawings. The WB gain corrector 15 is configured, in performing the white-balance processing, to apply a white-balance gain map as magnifying it with interpolation. The configuration may be made so that boundary portions are subjected to smoothing in magnification.

According to the multi-area white-balance control device 1 and the multi-area white-balance control method of the first or second embodiment, the configuration is made to acquire information for white-balance processing on the basis of estimated lighting-source color temperatures in the individual division areas and color information of areal image for the individual division areas as calculated, by considering at least one of a multi-area white-balance factor and a single-area white-balance factor in such a manner that, in the information for white-balance processing for a division area, the multi-area white-balance factor is weighted as more significant in a case where color information of a division area has a value higher than a predetermined value, than in a case where the color information of areal image for the division area fails to have a value higher than the predetermined value. Therefore, even if the estimated lighting-source color temperature in the division area is wrong, it is possible to acquire much appropriate information for white-balance processing for this division area. As a result, when the white-balance processing is performed for the entirety of the inputted image on the basis of the appropriate information for white-balance processing for the individual areas, it is possible to generate an image free from unnatural color reproduction at the concerned division area in the entirety of the inputted image.

Regarding the multi-area white-balance control device 1 of each of these embodiments, the explanation has been made of the example in which the image-area divider 11 divides an inputted image into blocks partitioned by horizontal and vertical parallel lines to have a uniform shape and area. However, shape and size of division areas generated by the area divider in the multi-area white-balance control device according to the present invention is not limited to the that of the embodiments described above. For example, any shape such as having a triangular or curved contour is applicable, and further, the division areas may differ in size.

The multi-area white-balance control device 1 of each of the embodiments may be constructed of a computer having a built-in hard disk in which a multi-area white-balance control program is recorded, wherein the multi-area white-balance control program is configured to make the computer function as the image area divider 11 (area divider), the color-temperature estimator 12 (lighting-source color temperature estimator), the color information calculator 13 (areal-image color information calculator), and the WB controller 14 (white-balance controller).

Alternatively, the multi-area white-balance control device 1 of each of the embodiments may be constructed of a medium that is readable by a computer, such as CD-ROM in which a multi-area white-balance control program is recorded, wherein the multi-area white-balance control program is configured to make the computer function as the image area divider 11 (area divider), the color-temperature estimator 12 (lighting-source color temperature estimator), the color information calculator 13 (areal-image color information calculator), and the WB controller 14 (white-balance controller).

Alternatively, the multi-area white-balance image-processing device 10 of each of the embodiments may be constructed of a computer having a built-in hard disk in which a multi-area white-balance image-processing program is recorded, wherein the multi-area white-balance image-processing program is configured to make the computer function as the image area divider 11 (area divider), the color-temperature estimator 12 (lighting-source color temperature estimator), the color information calculator 13 (areal-image color information calculator), the WB controller 14 (white-balance controller), and the WB gain corrector 15 (white-balance processor).

Alternatively, the multi-area white-balance image-processing device 10 of each of the embodiments may be constructed of a medium that is readable by a computer, such as CD-ROM in which a multi-area white-balance image-processing program is recorded, wherein the multi-area white-balance image-processing program is configured to make the computer function as the image area divider 11 (area divider), the color-temperature estimator 12 (lighting-source color temperature estimator), the color information calculator 13 (areal-image color information calculator), the WB controller 14 (white-balance controller), and the WB gain corrector 15 (white-balance processor).

Regarding the color information of areal image for a division area to be calculated by the areal-image color-information calculator 13, the explanation has been made of the example in which the saturation information is used. However, the color information to be calculated by the areal-image color-information calculator 13 is not limited to the saturation information. For example, information of Cr and Cb (color component information or chromaticity information) is available.

Shape and size of division areas generated by the area divider in the multi-area white-balance control device according to the present invention is not limited to the that of the embodiments described above. For example, any shape such as having a triangular or curved contour is applicable, and further, the division areas may differ in size.

The multi-area white-balance control device, the multi-area white-balance control method, the multi-area white-balance control program, the computer in which a multi-area white-balance control program is recorded, the multi-area white-balance image-processing device, the multi-area white-balance image-processing method, the multi-area white-balance image-processing program, the computer in which a multi-area white-balance image-processing program is recorded, and the image-capture apparatus provided with a multi-area white-balance image-processing device according to the embodiments of the present invention are useful in fields that need white-balance correction of an image by a mixed lighting source, that is, a picture taken under a plurality of light sources of different types.

What is claimed is:

1. A multi-area white-balance control device comprising:
   an area divider that divides an inputted image into a plurality of division areas;
   a lighting-source color-temperature estimator that estimates a lighting-source color temperature in each of the division areas;

an areal-image color-information calculator that calculates out color information of an areal image for each of the division areas; and a white-balance controller that acquires information for white-balance processing for each of the division areas on a basis of the lighting-source color temperature in each of the division areas estimated by the lighting-source color-temperature estimator and the color information of the areal image for each of the division areas calculated out by the areal-image color-information calculator;

wherein, in acquiring the information for white-balance processing for each of the division areas, the white-balance controller considers at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

2. The multi-area white-balance control device according to claim 1, wherein the information for white-balance processing for each of the division areas includes a white-balance coefficient for each of the division areas, wherein the white-balance controller comprises:
a multi-area white-balance coefficient generator that generates a multi-area white-balance coefficient for each of the division areas on a basis of the lighting-source color temperature in each of the division areas estimated by the lighting-source color-temperature estimator;
a single-area white-balance coefficient generator that generates a single-area white-balance coefficient; and
a white-balance coefficient synthesizer that calculates out the white-balance coefficient for each of the division areas by synthesizing the multi-area white-balance coefficient for each of the division areas and the single-area white-balance coefficient, and wherein, in calculating out the white-balance coefficient for each of the division areas, the white-balance coefficient synthesizer synthesizes the multi-area white-balance coefficient for each of the division areas and the single-area white-balance coefficient in such a manner that a component ratio of the multi-area white-balance coefficient increases according as a value of the color information of the areal image for each of the division areas increases.

3. The multi-area white-balance control device according to claim 2, wherein the color information of the areal image for each of the division areas includes saturation information.

4. A multi-area white-balance image-processing device comprising:
the multi-area white-balance control device according to claim 2; and
a white-balance processor that performs white-balance processing for the entirety of the inputted image, which is subject to division by the area divider, on a basis of the information for white-balance processing in the individual division areas acquired by the white-balance controller provided in the multi-area white-balance control device.

5. The multi-area white-balance control device according to claim 1, wherein the information for white-balance processing for each of the division areas includes a white-balance coefficient for each of the division areas, wherein the lighting-source color-temperature estimator further estimates a lighting-source color temperature in a single area as an entirety of the inputted image, on a basis of the lighting-source color temperatures in the individual division areas as estimated, wherein the white-balance controller comprises:
a color-temperature synthesizer that synthesizes the lighting-source color temperature in each of the division areas and the lighting-source color temperature in the single area estimated by the lighting-source color-temperature estimator, to calculate out an adjusted lighting-source color temperature in each of the division areas; and
a white-balance coefficient generator that generates the white-balance coefficient for each of the division areas on a basis of the adjusted lighting-source color temperature in each of the division areas calculated out by the color-temperature synthesizer; and wherein, in calculating out the adjusted lighting-source color temperature in each of the division areas, the color-temperature synthesizer synthesizes the lighting-source color temperature in each of the division areas and the lighting-source color temperature in the single area estimated by the lighting-source color-temperature estimator in such a manner that a component ratio of the lighting-source color-temperature in each of the division areas estimated by the lighting-source color-temperature estimator increases according as a value of the color information of the areal image for each of the division areas calculated out by the areal-image color-information calculator increases.

6. The multi-area white-balance control device according to claim 5, wherein the color information of the areal image for each of the division areas includes saturation information.

7. A multi-area white-balance image-processing device comprising:
the multi-area white-balance control device according to claim 5; and
a white-balance processor that performs white-balance processing for the entirety of the inputted image, which is subject to division by the area divider, on a basis of the information for white-balance processing in the individual division areas acquired by the white-balance controller provided in the multi-area white-balance control device.

8. The multi-area white-balance control device according to claim 1, wherein the information for white-balance processing for each of the division areas includes a white-balance gain map for each of the division areas, wherein the white-balance controller comprises:
a multi-area white-balance gain map generator that generates a multi-area white-balance gain map for each of the division areas on a basis of the lighting-source color temperature in each of the division areas estimated by the lighting-source color-temperature estimator;
a single-area white-balance gain map generator that generates a single-area white-balance gain map; and
a white-balance gain map synthesizer that calculates out the white-balance gain map for each of the division areas by synthesizing the multi-area white-balance gain map for each of the division areas and the single-area white-balance gain map, and wherein, in calculating out the white-balance gain map for each of the division areas, the white-balance gain map synthesizer synthesizes the multi-area white-balance gain map for each of the division areas and the single-area white-balance gain map in such a manner that a component ratio of the multi-area white-balance gain map increases according as a value of the color information of the areal image for each of the division areas increases.

9. The multi-area white-balance control device according to claim 8, wherein the color information of the areal image for each of the division areas includes saturation information.

10. A multi-area white-balance image-processing device comprising:

the multi-area white-balance control device according to claim 8; and a white-balance processor that performs white-balance processing for the entirety of the inputted image, which is subject to division by the area divider, on a basis of the information for white-balance processing in the individual division areas acquired by the white-balance controller provided in the multi-area white-balance control device.

11. The multi-area white-balance control device according to claim 1, wherein the information for white-balance processing for each of the division areas includes a white-balance gain map for each of the division areas, wherein the lighting-source color-temperature estimator further estimates a lighting-source color temperature in a single area as an entirety of the inputted image, on a basis of the lighting-source color temperatures in the individual division areas as estimated, wherein the white-balance controller comprises:
a color-temperature synthesizer that synthesizes the lighting-source color temperature in each of the division areas and the lighting-source color temperature in the single area estimated by the lighting-source color-temperature estimator, to calculate out an adjusted lighting-source color temperature in each of the division areas; and
a white-balance gain map generator that generates the white-balance gain map for each of the division areas on a basis of the adjusted lighting-source color temperature in each of the division areas calculated out by the color-temperature synthesizer; and wherein, in calculating out the adjusted lighting-source color temperature in each of the division areas, the color-temperature synthesizer synthesizes the lighting-source color temperature in each of the division areas and the lighting-source color temperature in the single area estimated by the lighting-source color-temperature estimator in such a manner that a component ratio of the lighting-source color-temperature in each of the division areas estimated by the lighting-source color-temperature estimator increases according as a value of the color information of the areal image for each of the division areas calculated out by the areal-image color-information calculator increases.

12. The multi-area white-balance control device according to claim 11, wherein the color information of the areal image for each of the division areas includes saturation information.

13. A multi-area white-balance image-processing device comprising:

the multi-area white-balance control device according to claim 11; and a white-balance processor that performs white-balance processing for the entirety of the inputted image, which is subject to division by the area divider, on a basis of the information for white-balance processing in the individual division areas acquired by the white-balance controller provided in the multi-area white-balance control device.

14. The multi-area white-balance control device according to claim 1, wherein the color information of the areal image for each of the division areas includes saturation information.

15. A multi-area white-balance image-processing device comprising:

the multi-area white-balance control device according to claim 1; and a white-balance processor that performs white-balance processing for the entirety of the inputted image, which is subject to division by the area divider, on a basis of the information for white-balance processing in the individual division areas acquired by the white-balance controller provided in the multi-area white-balance control device.

16. An image capture apparatus provided with the multi-area white-balance image-processing device according to claim 15.

17. A multi-area white-balance control method comprising:

dividing an inputted image into a plurality of division areas;

estimating a lighting-source color temperature in each of the division areas;

calculating out color information of an areal image for each of the division areas; and acquiring information for white-balance processing for each of the division areas on a basis of the lighting-source color temperature in each of the division areas estimated and the color information of the areal image for each of the division areas calculated out;

wherein acquisition of the information for white-balance processing for each of the division areas includes considering at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

18. A computer which is provided in a multi-area white-balance control device and in which a multi-area white-balance control program is recorded, wherein the multi-area white-balance control program is configured to make the computer function as:
an area divider that divides an inputted image into a plurality of division areas;
a lighting-source color-temperature estimator that estimates a lighting-source color temperature in each of the division areas;
an areal-image color-information calculator that calculates out color information of an areal image for each of the division areas; and a white-balance controller that acquires information for white-balance processing for each of the division areas on a basis of the lighting-source color temperature in each of the division areas estimated by the lighting-source color-temperature estimator and the color information of the areal image for each of the division areas calculated out by the areal-image color-information calculator; and wherein, in acquiring the information for white-balance processing for each of the division areas, the white-balance controller considers at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

19. A multi-area white-balance control program which is provided on a non-transitory computer readable medium, and which is readable by a computer provided in a multi-area white-balance control device, wherein the multi-area white-balance control program is configured to make the computer function as:

an area divider that divides an inputted image into a plurality of division areas;

a lighting-source color-temperature estimator that estimates a lighting-source color temperature in each of the division areas;

an areal-image color-information calculator that calculates out color information of an areal image for each of the division areas; and a white-balance controller that acquires information for white-balance processing for each of the division areas on a basis of the lighting-source color temperature in each of the division areas estimated by the lighting-source color-temperature estimator and the color information of the areal image for each of the division areas calculated out by the areal-image color-information calculator; and wherein, in acquiring the information for white-balance processing for each of the division areas, the white-balance controller considers at least one of a multi-area white-balance factor and a single-area white-balance factor in such a manner that the multi-area white-balance factor is weighted as more significant in a case where the color information of the areal image for each of the division areas has a value higher than a predetermined value, than in a case where the color information of the areal image for each of the division areas fails to have a value higher than the predetermined value.

* * * * *